United States Patent
Dahl

(10) Patent No.: US 9,180,493 B2
(45) Date of Patent: Nov. 10, 2015

(54) SHAKER SCREEN FILTER FOR A DRILLING FLUID SHAKER

(75) Inventor: Bjørn Dahl, Loen (NO)

(73) Assignee: Optipro AS, Stryn (NO)

( * ) Notice: Subject to any disclaimer, the term of this patent is extended or adjusted under 35 U.S.C. 154(b) by 317 days.

(21) Appl. No.: 12/913,703

(22) Filed: Oct. 27, 2010

(65) Prior Publication Data

US 2011/0094950 A1    Apr. 28, 2011

Related U.S. Application Data

(60) Provisional application No. 61/255,356, filed on Oct. 27, 2009.

(30) Foreign Application Priority Data

Oct. 27, 2009  (NO) .................................... 20093231

(51) Int. Cl.
| | |
|---|---|
| B01D 35/00 | (2006.01) |
| C02F 1/00 | (2006.01) |
| B07B 1/49 | (2006.01) |
| B07B 1/46 | (2006.01) |
| F16B 21/06 | (2006.01) |

(52) U.S. Cl.
CPC ............... B07B 1/4618 (2013.01); B07B 1/469 (2013.01); B07B 1/4627 (2013.01); B07B 1/4645 (2013.01); B07B 1/4663 (2013.01); B07B 1/4672 (2013.01); B07B 2201/02 (2013.01); F16B 21/06 (2013.01)

(58) Field of Classification Search
None
See application file for complete search history.

(56) References Cited

U.S. PATENT DOCUMENTS

| | | | |
|---|---|---|---|
| 3,363,381 A | 1/1968 | Forrest | |
| 4,040,654 A * | 8/1977 | Hill et al. | ..................... 296/57.1 |
| 4,367,477 A * | 1/1983 | Dower | ..................... 346/33 WL |
| 4,674,251 A | 6/1987 | Wolff | |
| 5,137,622 A | 8/1992 | Souter | |
| 5,351,543 A * | 10/1994 | Migliori et al. | ................. 73/579 |
| 5,816,413 A | 10/1998 | Boccabella et al. | |
| 6,220,449 B1 * | 4/2001 | Schulte et al. | ................ 209/401 |
| 6,267,246 B1 | 7/2001 | Russell et al. | |
| 6,290,068 B1 | 9/2001 | Adams et al. | |
| 6,629,610 B1 * | 10/2003 | Adams et al. | ................ 209/399 |

(Continued)

FOREIGN PATENT DOCUMENTS

| | | |
|---|---|---|
| AU | 48398/79 | 1/1981 |
| AU | 75370/96 | 2/1997 |

(Continued)

*Primary Examiner* — Nam Nguyen
*Assistant Examiner* — Richard Gurtowski
(74) *Attorney, Agent, or Firm* — Birch, Stewart, Kolasch & Birch, LLP

(57) ABSTRACT

An improved shaker screen filter for a well fluid shale shaker includes a main frame arranged for being arranged in the well fluid shale shaker for screening, preferably under vibration, of drilling mud, wherein the mainframe is subdivided into a plurality of smaller cell frames, one or more cell plug filters with one or more layers of screen cloths on top of at least one support cloth or support layer, wherein each of the cell plug filter includes a cell plug filter frame arranged to be held in each of the cell corresponding frames of the main frame, wherein at least one of the cell plug filter frame includes a locking mechanism arranged for locking the cell plug filter frame, upon desire, in a preferred position in the cell frame, correspondingly releasing the cell plug filter frame from the cell frame.

20 Claims, 15 Drawing Sheets

(56) References Cited

U.S. PATENT DOCUMENTS

| | | |
|---|---|---|
| 2003/0132141 A1* | 7/2003 | Adams et al. ............... 209/399 |
| 2004/0074821 A1 | 4/2004 | Russell et al. |
| 2006/0108113 A1* | 5/2006 | Scott et al. ............... 166/255.1 |
| 2006/0180510 A1 | 8/2006 | Freissle et al. |
| 2006/0219608 A1 | 10/2006 | Scott et al. |
| 2007/0101802 A1* | 5/2007 | Biggs ............................. 73/38 |
| 2008/0078703 A1 | 4/2008 | Robertson |
| 2008/0283448 A1 | 11/2008 | Bacho et al. |
| 2009/0050374 A1* | 2/2009 | Spiecker et al. ............... 175/66 |

FOREIGN PATENT DOCUMENTS

| | | |
|---|---|---|
| DE | 36 06 854 A1 | 9/1987 |
| DE | 4136898 A1 | 5/1993 |
| GB | 2203061 A | 10/1988 |
| GB | 2 210 292 A | 6/1989 |
| GB | 2245191 A | 1/1992 |
| GB | 2349102 A | 10/2000 |
| NO | 178609 B | 1/1996 |
| WO | WO 2004/045198 A2 | 5/2004 |
| WO | WO2008/077181 * | 7/2008 |
| WO | WO 2008/077181 A1 | 7/2008 |

* cited by examiner

Fig. 3a and 3c (enlarged portion)
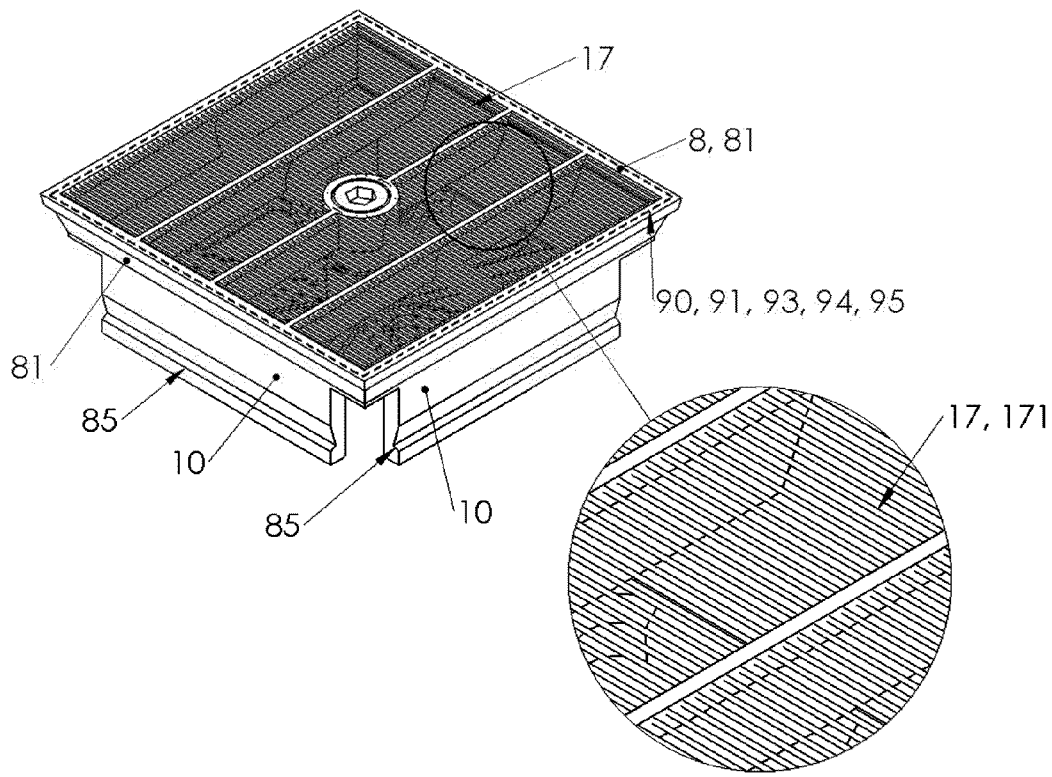
Fig. 3b
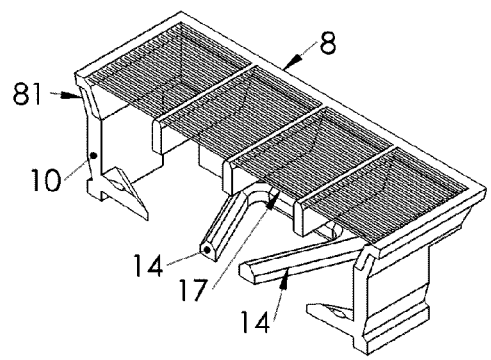

Fig. 14a
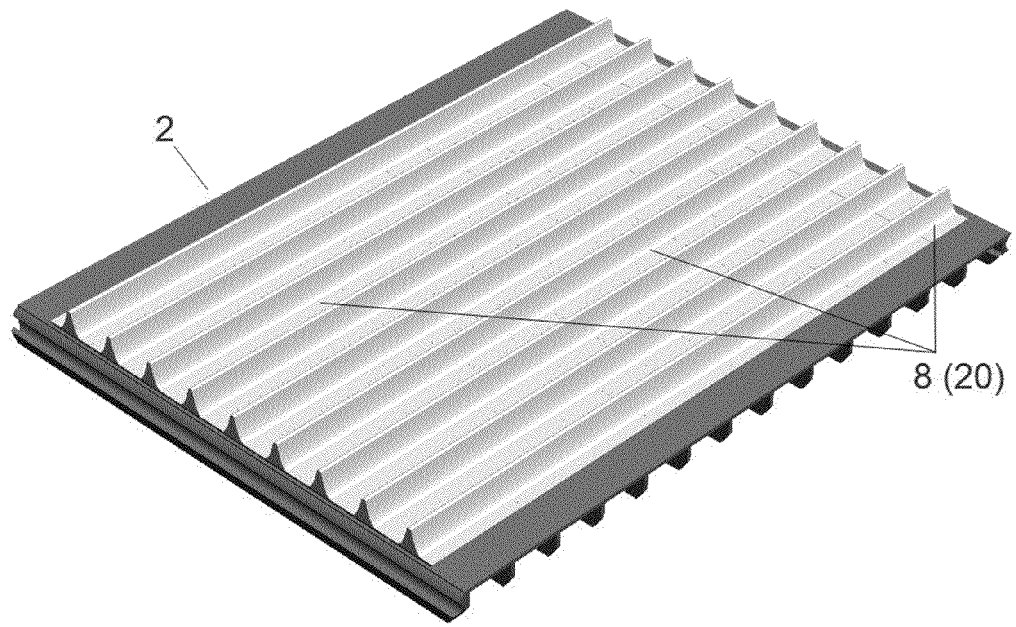
Fig. 14b
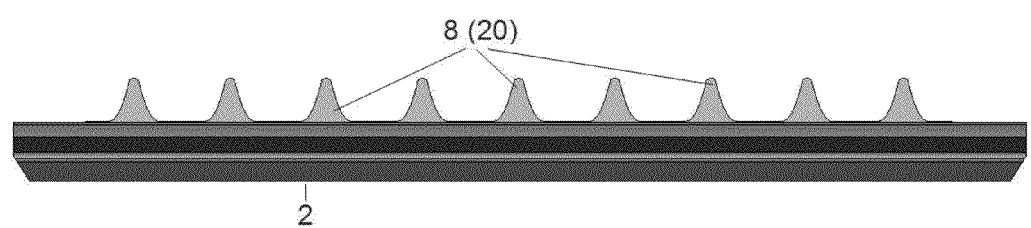
Fig. 14c          Fig. 14d
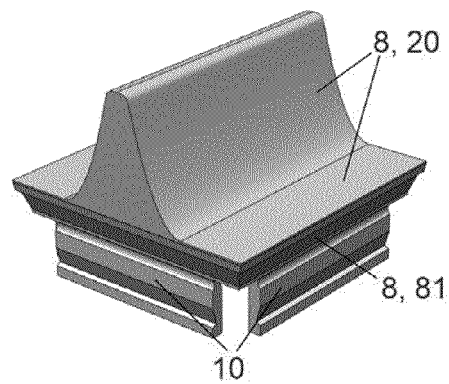   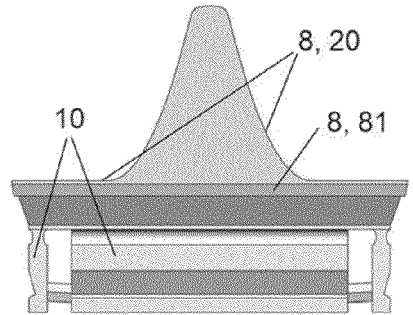

SHAKER SCREEN FILTER FOR A DRILLING FLUID SHAKER

This non-provisional application claims the benefit under U.S.C. 119(e) of U.S. Provisional Application No. 61/255, 356 filed on Oct. 27, 2009, and under 35 USC 119(a) to Patent Application No. NO20093231 filed in Norway, on Oct. 27, 2010. The entire contents of the above application is hereby incorporated by reference.

The invention relates to an improved shaker screen filter for a drilling fluid shaker or a general well fluid filter machine. More specifically, the invention relates to a screen filter for use in a shale shaker for removal of undesired particles from a well fluid in a drilling process for a petroleum borehole in the petroleum industry. The particles which are separated may comprise cuttings, rock particles, metal particles, additives, and chemicals in solid state. The well fluid may be water based drilling mud (WBM: water based mud) or oil based (OBM: oil based mud) well fluid if filtering during drilling. If circulating shall be conducted under other circumstances than drilling, for instance for to circulate out the well during completion of a drilled and lined well to make a production well, the liquid is called a completion fluid.

BACKGROUND ART

There are patents that describe shaker screen filters with cell frames. Such shaker screen filters normally have an integral, coarse supporting layer and at least one finer screen cloth extending over all of the cell frames on top, and fastened to the cell frames. The finer screen cloth has a given cut-point, i.e. the largest particle size allowed to pass trough.

GB224591A Balley describes a way to repair damaged screen cloths in shaker screens wherein the shaker screens in principle have a screen cloth that covering the entire shaker screen and may be replaced cell by cell when broken or worn. Damaged screen cloths and its underlying support cloth which covers the cell frame is cut entirely away, and a replacement cell with the same cloth and a frame that fits in the cell frame, is installed. In this way a entire screen frame may be repaired cell by cell. The replacement cell in GB2245191 has a frame that may be snapped in place in a cell frame in the main frame. A risk by that is that when you cut away the screen cloth and the support cloth in a cell frame, the local tension in the remaining screen cloth and support cloth is lost, so that a risk of delamination between the remaining screen cloth and the support cloth and the underlying cell frame structure arises.

British patent application GB 8708612 describes a rectangular main frame which is moulded in a plastic material such as glass-fiber-reinforced polyester resin. The frame comprises a main frame which is parted by crossing bars in identically shaped rectangular cells. A number of cell cartridges with screen cloth spanned over may be locked releasably in this main frame.

Several types of shaker screens exist for use in shakers for separating particles. In principle they may be subdivided into two main categories:

A: frame filters as shown in GB2245191A with a rigid mainframe divided into cell frames covered with a support layer and screen cloth, wherein the main frame is arranged to be inserted in a screen shaker.

B: hook strip filters arranged as a screen cloth with rigid kinked metal attachment profiles arranged for being fastened to corresponding fastening profiles at the screen shaker. Subcategories of hook strip filters comprise a drum coated by screen cloth at the outside, and a ribbon comprising a screen cloth.

PROBLEMS RELATED TO THE PRIOR ART

A substantial problem related to the known screen shaker filters is the relatively short lifetime before wear and holes in the screen cloth occurs. A section through a regular screen cloth is shown in FIG. 9a and explained in more detail below. The screen frame incurs relatively excessive internal friction movement between the supporting cloth and the top filter cloth at the crossing points where the wires of the support cloth mutually cross and form sharp tops, please see FIGS. 9b, 9c and 9d. As the weight of the well fluid and impacts from the cuttings from the geological formation expose the top side of filter cloth, the filter cloth is pressed down against the underlying tops and are in general worn in all such points. The apertures in the here presented support cloth are about 850× 850 micrometers, i.e. 0.85×0.85 mm, and the wires' diameter is 330 micrometer, i.e. 0.33 mm. The screen cloth itself is much finer and the desired degree of fineness depends on the cut-point is desired for the filtered fluid. The apertures in the filter cloth are here 76×76 micrometers, i.e. 0.076 mm×0.076 mm, and the wire diameter is 30 micrometer, i.e. 0.030 mm.

Wear and breakage of screen cloths in screen shakers are major problems in the industry today and incur negative conditions during drilling as relatively large amounts of unfiltered liquid/particles leak trough the shaker screen cloths. Wrong particle size distribution (PSD) may negatively influence the progress of drilling because the composition and properties will not be as intended, neither for the relevant drilling interval, but also during transportation down through the drill pipe to the bit, and during transport back with the drilled particles and cuttings, on its way between the well's wall and the drill pipe, trough the riser and back to the drilling mud handling system at the drill rig. At the Norwegian continental shelf the industry operates with a production of 2.7 $m^3$ of formation masses per used filter screen frame with about 20% patched or repaired filtering area, while with the improved filter screen frame, with modular cell frame filters of the present invention, a multiple increase in lifetime of each filter frame is anticipated. IADC/SPE 103934 for more background information about the subject.

SHORT SUMMARY OF THE INVENTION

The invention, in a first aspect, is an improved shaker screen filter (2) for a well fluid shale shaker (7) comprising the following features:

- a mainframe (1) arranged for being inserted in the well fluid shale shaker (7) for screening, preferably during vibration, of drilling mud, the mainframe (1) subdivided into a plurality of smaller cell frames (4),
- one or more cell plug filters (8) with one or more layers of screen cloths (20) on top of at least one support cloth or support layer (18,17), each cell plug filter (8) comprising a cell plug filter frame (81) arranged to be held in a cell frame (4) in the main frame,
- wherein at least one cell plug filter frame (81) comprises a locking mechanism (85, 10, 12, 13, 15) arranged for locking the cell plug filter frame (81), when desired, in a preferred position in the cell frame (4), or release the cell plug filter frame (81) from the cell frame (4), respectively.

The invention is, in another aspect, an improved cell plug filter (8) for a shaker screen filter (2) for a well fluid shale shaker (7), wherein the shaker screen filter (2) has a main frame (1) arranged for being arranged in a well fluid shale shaker (7) for vibration screening of the well fluid mud, wherein the mainframe (1) is subdivided into a number of smaller cell frames (4), characterized in
that the cell plug filter (8) comprise the following features:
one or more layers of screen cloths (20) on top of at least one support cloth or support layer (18,17), each cell plug filter (8) comprising a cell plug filter frame (81) arranged to be held in a cell frame (4) in the main frame,
wherein at least one cell plug filter frame (81) comprises a locking mechanism (85, 10, 12, 13, 15) arranged for locking the cell plug filter frame (81), when desired, in a preferred position in the cell frame (4), respectively releasing the cell plug filter frame (81) from the cell frame (4).

Various preferred embodiments of the invention are defined in the dependent claims.

Advantages of the Invention

A first advantage of the invention is that the filtering capability of the screen shaker as a whole is modified and improved in that it comprises cell plug filters or filter plug of conventional type or of the inventions type, upon wear or when in need for repair, those are replaced by the new cell plug filters according to the invention. Remaining filtering area after repair is, due to that the cell frame filter plug has an opening that in all essentials is equivalent to the circumference of the cell frame (4), always near 100% of the original, because the total filtering area is not affected by the patched area in the prior art, but is replaced by a new cell plug filter with intact filter cloth.

A second advantage of the invention is a substantially reduced time consumption for repairing the shaker screen filter by exchanging the screen cloth in a cell frame (4) by a new cell plug filter (8). Compared to the traditional repairing of the screen cloth according to known patching technique the time consumption for changing to a new cell plug filter will probably be less than 1/10 of the time consumption attended by exercising the prior art.

A third advantage of an embodiment of the invention is that one achieves a reduced wear of the filter cloth due to reduced internal friction between the filtering cloth (or the filtering cloths 20,21)) and the substrate forming support layer (17) or the support cloth (18). The support layer (17), which, according to an embodiment of the invention comprises pre-tensioned wires (171) made in a suitable material (steel- or synthetic), is arranged mutually parallel and thus has a smoother surface than the peaks which forms by the traditional braided metallic support cloth, and thus provides reduced wear on the overlying filter cloth both because the contact surface between the wires (117) of the support layer and the overlying screen cloth (20) becomes even and smooth, and because the peaks in the crossovers between wires (181) in an ordinary braided metallic support cloth (18) are avoided.

A fourth advantage of an embodiment of the invention is that it allows a variety of assemblies of different cell plug filters within the same shaker screen filter (shaker screen). The meaning of filter cloth (20) is a woven assembly of wire, synthetic material, permeable membranes or permeable foils that each should filter out, or let trough particles of a certain size, or particle size distribution (PSD). This allows active control of the shaker screen filter's total capability to gain a desired particle size distribution PSD in a well fluid via the primary cleaning plant at the rig, which is desirable, based on that in the resulting filtered well fluid, one do not only desire as low as possible maximal cut-point, but an overall particle distribution wherein different desired amounts of particles of different sizes are present.

A fifth advantage of an embodiment of the invention is that the cell plug filters (8) may comprise a color coding based on cut-point or their PSD, of which each filter quality has its own color combination. Color coding may reduce the risk for mounting filters of wrong cut-point.

A sixth advantage of an embodiment of the invention is that the cell plug filter may be provided with sensors for consecutive measurement of, and real time registering of the state of the screen cloth e.g. by degree of wear and filtering capability. According to a further embodiment of the invention the information about the condition of the cell plug filter frames may be stored via RFID technology and be presented to the control room at the rig and on shore. One may through this registering achieve a history of use, for both each single cell plug filter, and for each single screen frame.

A seventh advantage of an embodiment of the invention is a adapted entry gasket between the screen shaker filter and the screen shaker. An entry gasket will improve the quality of the primary screening with nearly full sealing between two and two screen frames, and between the screen frame and the tightly enveloping profile of the shaker machine that holds the screen shaker frames.

An eight advantage of an embodiment of the invention is reduced use of raw material, because the invention comprises a main frame with long lifetime. The main frame (1) with the frame (3) with the cell frames (4) may be of metal or may be built in a robust composite material with a anticipated life time of more than 15000 operating hours, about 2.8 operating years at 40% operating time for drilling/circulating/active use.

A ninth advantage of an embodiment of the invention is the resulting reduction of logistics around the handling and transport of screen shaker frames on board, and to and from the drilling platform and drilling rig, as well as a reduced need for storing capacity at the platform. This is very important as the cost per square meter on a drilling platform is high, and there always is a fight for free space resources. Reduced cargo, as cell plug filters instead of the whole replacement main frames, provide logistic advantages and environmental and economical profit.

A tenth advantage, in an embodiment of the invention, is the choice of material, plastic, for the cell plug filters, mainly recyclable, re-meltable thermoplastic. The main frame may alternatively be manufactured in fiber-reinforced thermoplastic. Both of these structures allow reuse of materials for the filter plugs and frames.

An eleventh advantage of an embodiment of the invention is the use of a stabilizing point of synthetic—or curing flexible material which is baked into the combined filter and support cloth/-layer comprising the function of reducing the friction between the wires internally in screens and between the wires and the underlying filter/support layer/-cloth.

SHORT FIGURE CAPTIONS

The invention is illustrated in the attached figure drawings, where

FIG. 1 is an isometric sketch of a complete, modular screen cloth filter according to the invention, comprising a screen frame and a cell plug filter arranged for to be held in the screen cloth filter and with a locking mechanism arranged for locking or releasing each single of the cell plug filter frames. The orientation of the long-side crossbars of the screen clothe filter may be longitudinal, or in transverse direction of the main frame.

FIG. 2 is an isometric sketch of the main frame, here without filter plugs installed.

FIG. 3 shows different isometric sketches of the so-called filter plug, that is, the cell plug filter. FIG. 3A shows a rib layer, a support layer (17) for a screen cloth (20), a support point for the screen cloth and provided with an assembly screw for locking and opening of the cell frame filter plug to a cell in the main frame. FIG. 3B shows a vertical section of the cell plug filter wherein the ribs in the rib layer and the long-side of the cell plug filter frame is cut trough. FIG. 3C show an enlarged section of a rib as in is upper edge holds a part of the bars or wires of the support layer (17) (which in turn are supporting the screen cloth (20), which is not shown).

FIG. 5 shows the cell plug filter in different aspects.

In an alternative embodiment of the invention the cell plug filters may have fixed edge profiles arranged for interacting with an active locking profile in the cell frame (4) of the main frame (1). FIG. 6 is a partial section of a joint between frames (1, 2) as normally two or more frames are arranged consecutively in a screen shaker.

Figure 6A:
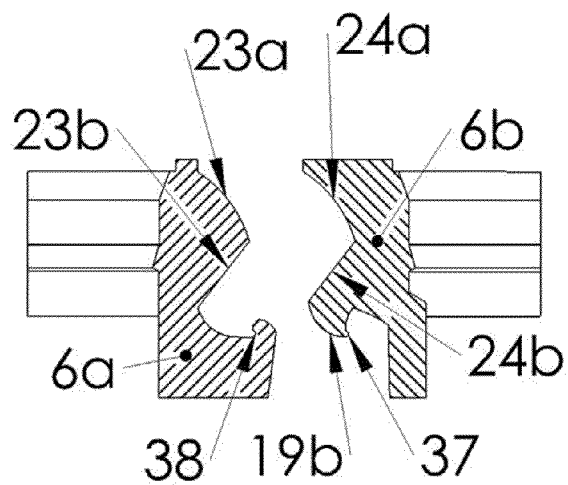

FIG. 6a shows opposite arranged joint profiles (6a, 6b) arranged for engage to each other by the joint profile-tongue (6b) of the screen cloths (2, 1) is pushed towards the joint profile-groove (6a). The joint profile-tongue (6b) entering the upwardly protruding leading profile (37) to for contact between sealing surfaces (24b, 23b) for thereby to be forced/steered/led downwards to the locking profile-tongue (6b), sealing surface (24a) tightens toward sealing surface (23a). In addition, one of the joint profiles (6b) may be arranged for interlocking with an entry gasket (25) in the shaker screen frame. One of or both the locking profiles (6) and the entry gasket (25) may be flexible and sealing.

Figure 1:
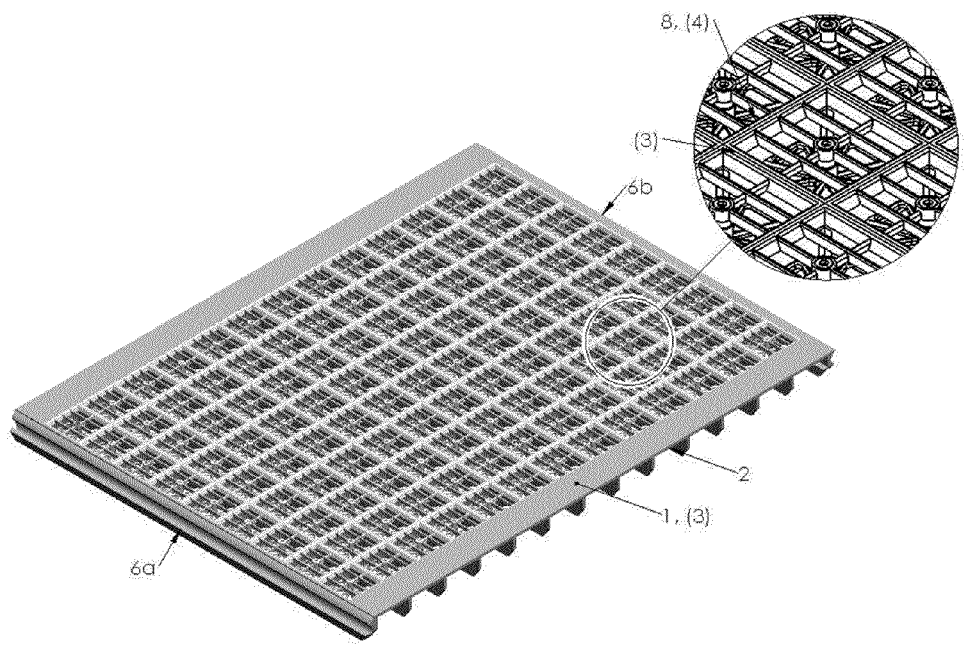
Figure 2:
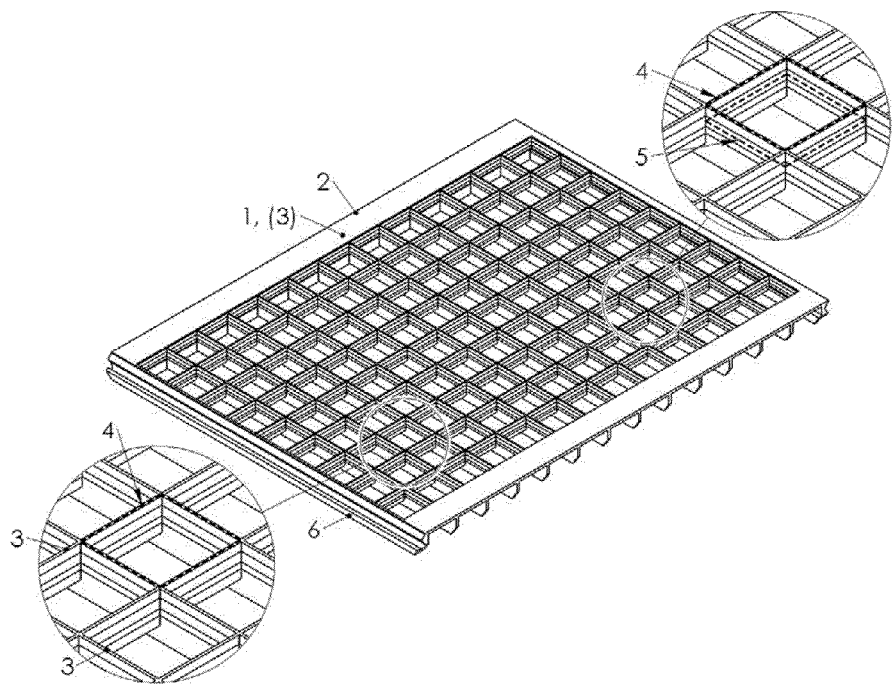
Figure 6B:
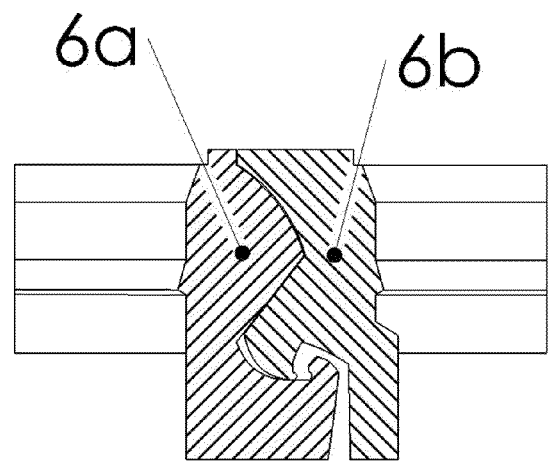

FIG. 6b shows corresponding joint profiles (6a, 6b) in engagement. Two shaker screens (1, 2) may be provided with a joining profile (6b) in front and a joining profile (6a) in the rear end so as for them to be connected in their longitudinal direction. The joining profile (6b) in the right part of FIG. 6a corresponds to the joining profile (6b) that the main frame has in front in the right, upper part of FIG. 1. A similar entry gasket (25) in the left part of FIG. 7a may as well be arranged in the screen shaker to receive and hold the front edge with the joint profile (6b) of the main frame (1), as shown in FIG. 7b.

Figure 6C:
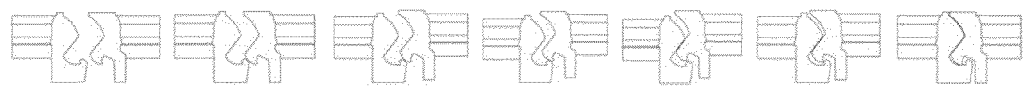

FIG. 6c show the corresponding joining profiles (6a, 6b) in their installation stage.

Figure 6D:
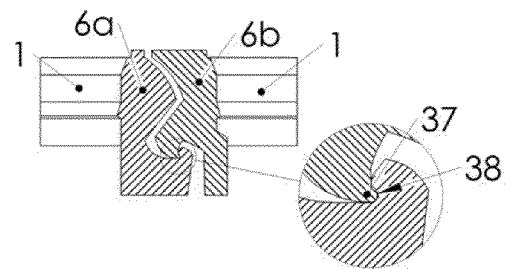

FIG. 6d show corresponding joining profiles (6a, 6b) in position for disconnection and for being pulled out (36) of one or more of shaker screen cloths (2, 1) already in place. The active movement from the position shown in FIG. 6b, to the position shown here in FIG. 6c, takes the joining profile (6b) to a pull-out position (36)—see enlarged detail section which also shows an engagement profile (38).

Figure 6E:
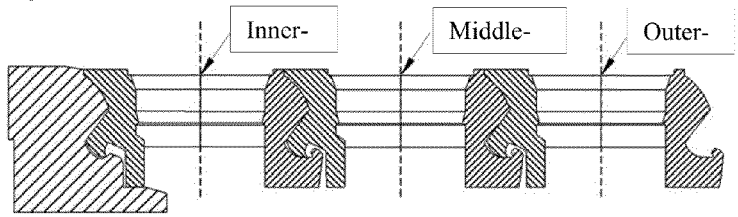

FIG. 6e shows mutually corresponding joint profiles (6a, 6b), here for three shaker screen filters (2); outer-, middle- and inner-, assembled in line and in a sealing engagement with the entry gasket (25).

Figure 6F:
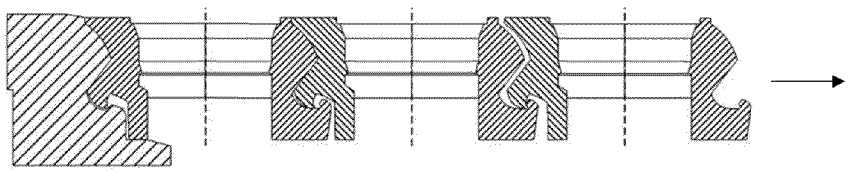

FIG. 6f shows the same as FIG. 6e, supplementary showing a beginning disassembly process in which a gap is forming between the sealing profiles (23a, 24a, 23b, 24b) of the outer- and middle-shaker screen filters (2). The leading profile (37) and the engagement profile (38) are in mutual engagement and allow them to be pulled out and disassembly of several shaker screen filters (2) at the same time at these come with the first shaker screen filter (2).

Figure 6G:
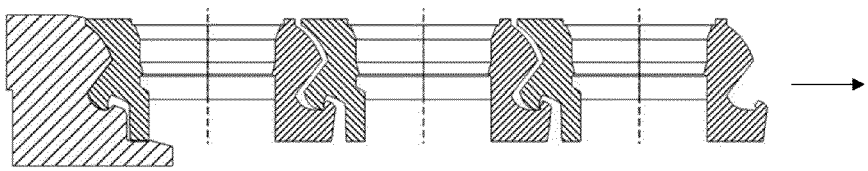

FIG. 6g shows the same as FIG. 6f, supplementary showing a propagating effect between the inner- and middle shaker screen cloths (2).

Figure 6H:
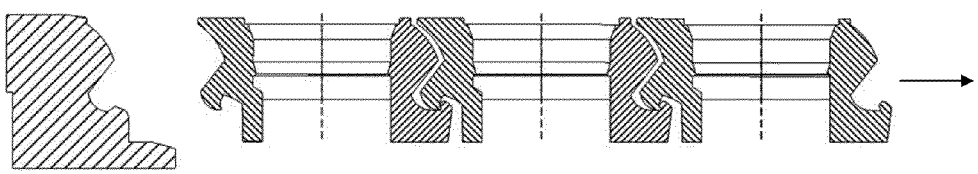

FIG. 6h shows the same as FIG. 6g, supplementary showing shaker screen filters (2), here in a number of three, are free from the entry gasket (25) and about to becoming disassembled.

Figure 7A:
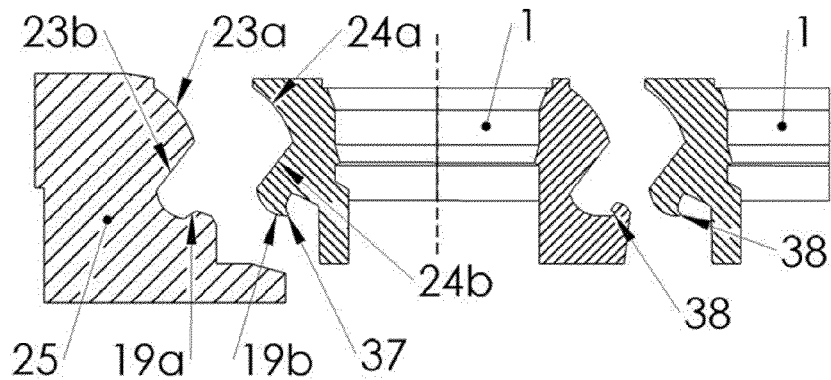
Figure 7B:
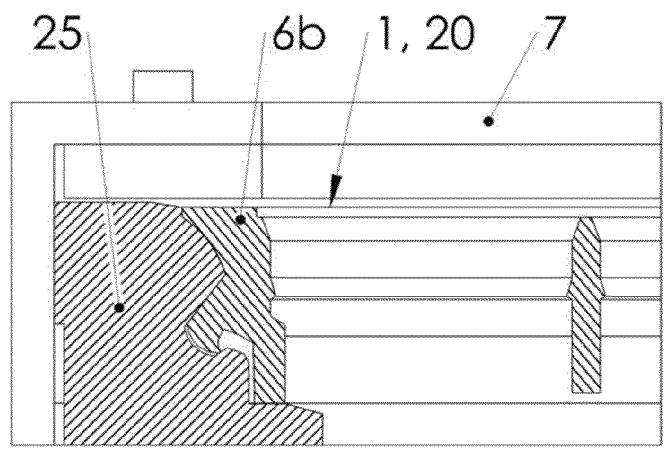

FIG. 7a is a section drawing of the joint profile (6b) which fits one end of the shaker screen filter (2), and the entry gasket (25) is designed adapted to a belonging well fluid shaker machine (7). The entry gasket (25) as illustrated in FIGS. 7a and 7b has an upper sealing profile (23a), and a lower sealing profile (23b) which together with the entry ridge (19a) lifts the joint profile (6b) of the main frame (1, 2) via entry bottom (19b) and thereby enters into gasket (25)

In FIG. 7b it is shown a situation where the shaker screen filter (2) is shoved fully into position in an entry gasket (25) that provides sealing between the sealing profiles (23a, 23b, 24a, and 24b) in a way that the screen shaker (7) may run, and drill mud is dropped down at the screen cloth (20) in the main frame (1).

Figure 7C:
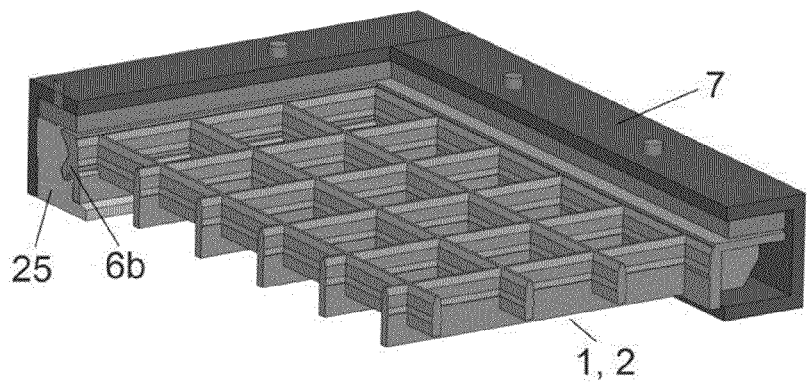

In FIG. 7c (section) it is shown an entry gasket (25) arranged in a screen shaker (7). The joint profile (6b) from FIG. 6b is shown in engagement with an entry gasket (25) mounted in shaker in pneumatic locking to a filter frame (1, 2). (The cell frame filters (8) are, in order to simplify, not shown).

Figure 8:
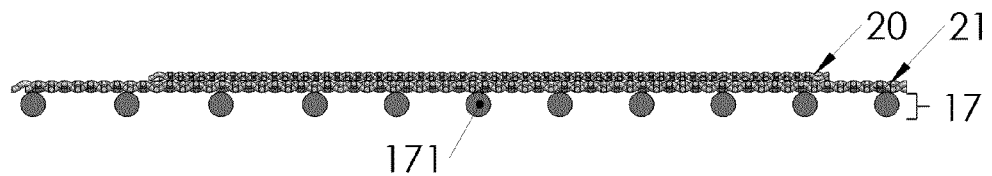

FIG. 8 is an enlarged cross section through the uniformly directed wires or bars (171) of the support layer (17) shown in for instance FIG. 3b. Here a screen cloth (20) which bears directly against or indirectly against the uniform wires (171) of the support layer (17) is shown.

FIG. 9 shows different aspects of a traditional support cloth. FIG. 9a is a section which corresponds to FIG. 8, but it is shown a woven support cloth (18) of metal wires (181). The screen cloth (20) will then bear directly on the cross-over points between the metal wires (181) of the support cloth (18).

Figure 9A:
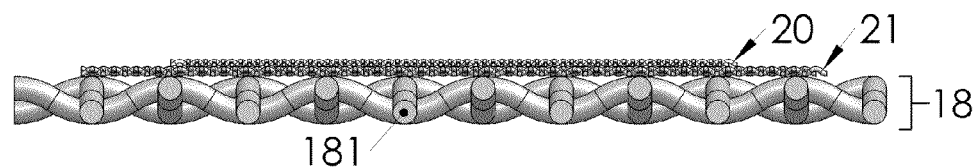
Figure 9B:
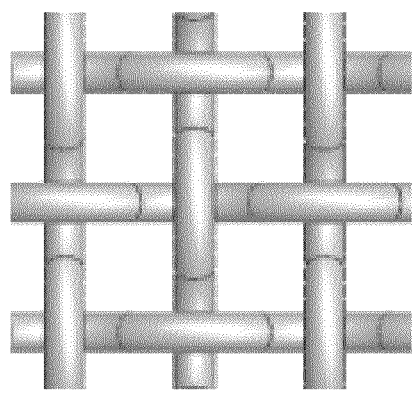

FIG. 9b shows a strongly enlarged plan view image of such a woven support cloth of metal wires (181) and one will see that there are alternating protrusions of each wirer (181) for each second crossing.

Figure 9C:
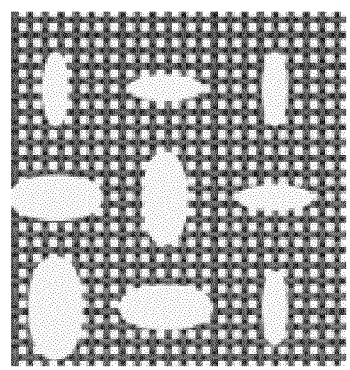

FIG. 9c shows a corresponding strongly enlarged plan view image of a screen cloth (20) with open, incipient wear holes.

Figure 9D:
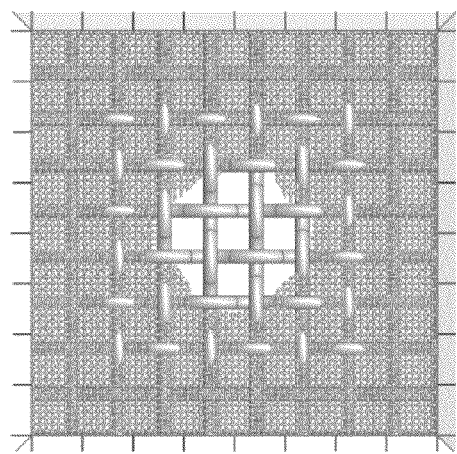

The positions of the holes and their partly extended form in alternating directions 90 degrees to each-other, correspond to the shape of the support cloth (18) with alternate orientated protrusions of metal wire (181) in every cross-over as shown in FIG. 9b. FIG. 9d shows an enlarged part of a screen frame in a magnifying frame as originally is 2.54×2.54 cm², accordingly a square inch. The picture shows a central open wear hole in the screen cloth in a way that the support cloth (18) remains in the middle. One may clearly seethe wear phenomenon described under FIG. 9c above, and that this phenomenon increases towards the open wear hole.

Figure 10A:
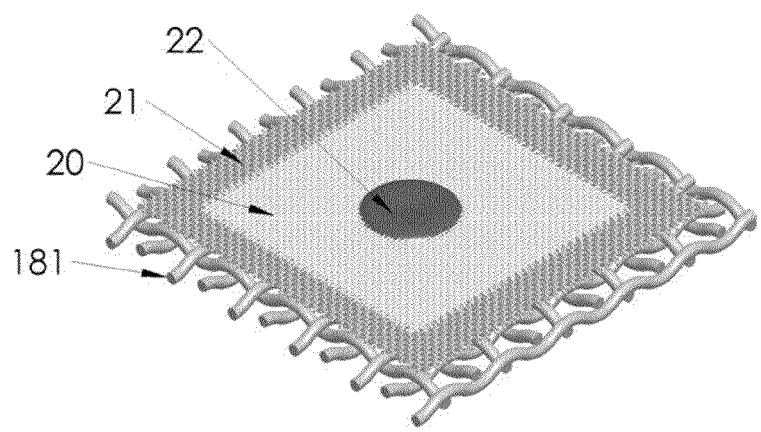
Figure 10B:
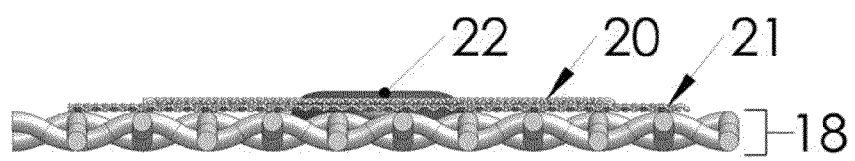
Figure 10C:
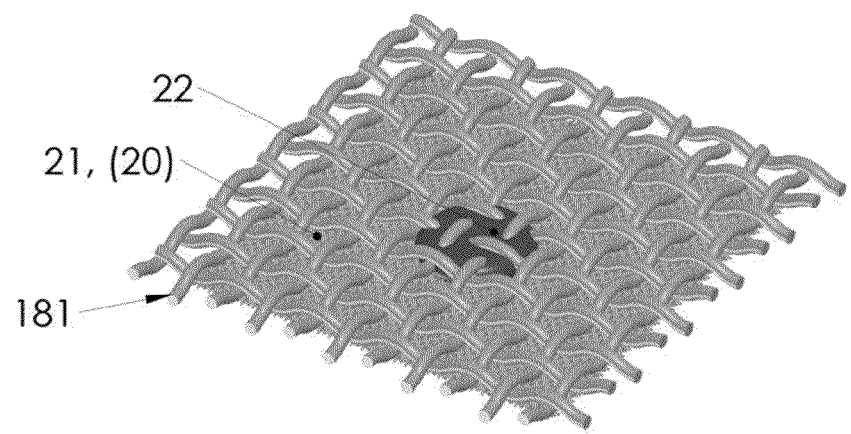
Figure 10D:
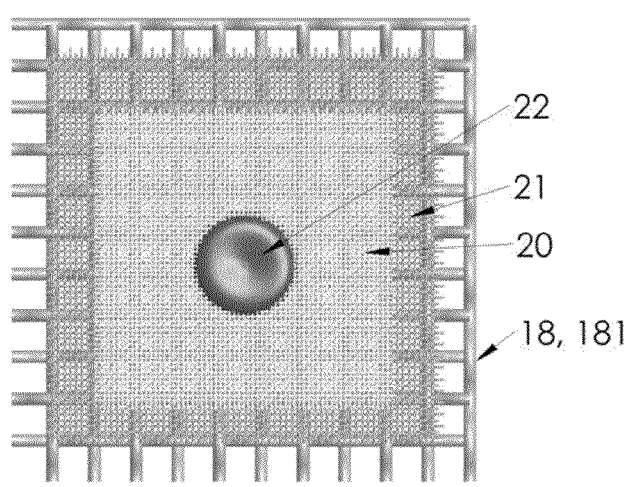
Figure 10E:
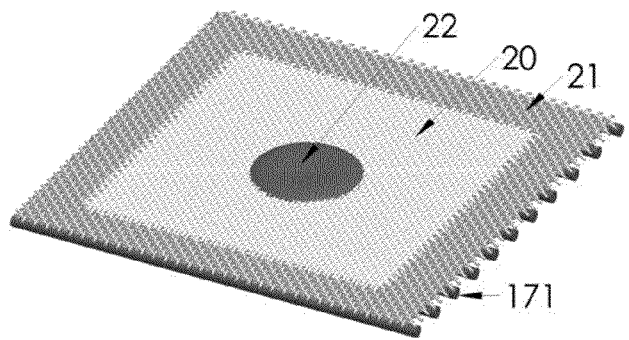

FIG. 10a, accordingly FIG. 10e, shows perspective views of a stabilization point (22) of synthetic or curing paste material which is formed by for instance injecting into the filter with support cloth (18) and into filter with support layer (17) with the function to reduce the internal movement and contact between the wires in accordingly the filter cloth (20) and the underlying support layer (17) or the support cloth (18). Please notice that FIG. 10e shows a somewhat coarser, underlying screen cloth (21) between the screen cloth (20) and the support layer (17), which is also commonly used together which ordinary support cloths (18), see FIG. 10a. A such coarser screen cloth (21) may be one class coarser than the screen cloth (20) and is arranged under this preferably to make the screen cloth more robust against impacts from the cuttings (eng.: "cuttings") in the well fluid, but also to increase the wear resistance against the underlying support cloth (18) or the support layer (17)

Figure 10F:
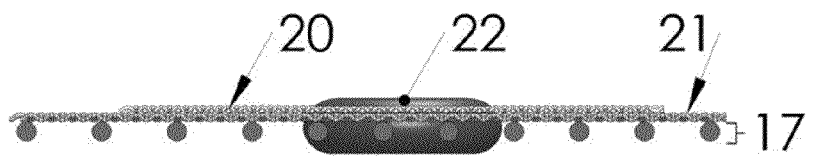
Figure 10G:
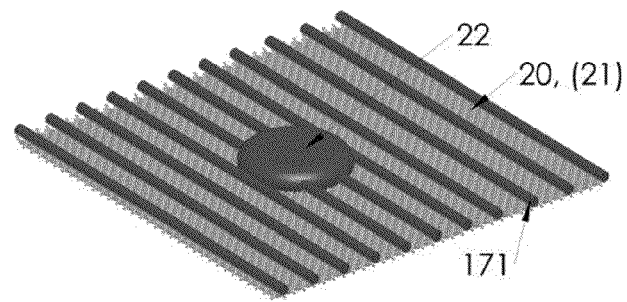

FIG. 10b and FIG. 10f show a section through a corresponding construction of a support cloth (18), accordingly support cloth (17) connected via an injected stabilization point (22) of the screen cloth (20, 21). FIG. 10c, accordingly 10g shows the support cloth (18), accordingly support layer (17), in an inclined view from below. The stabilization point (22) may also reduce the internal friction between the wires in the filter cloth (20), or internal friction between the wires (171) of the support layer (17). It is possible to form the stabilization point (22) close to or on the head of the mounting screw (12) as a central point on the cell plug filter (8) after mounting of this in the cell frame (4), but a stabilization point (22) may also be used in a cell plug filter separately from and independent of a possible locking mechanism. The stabilization point (22) may, supplementary to being used to lock the screen cloth and the support layer/support cloth to each other to prevent internal friction and with that the wear, also change and decrease the frequency characteristic of the combined screen cloth/support layer in a way that the vibration is reduced.

Figure 10H:
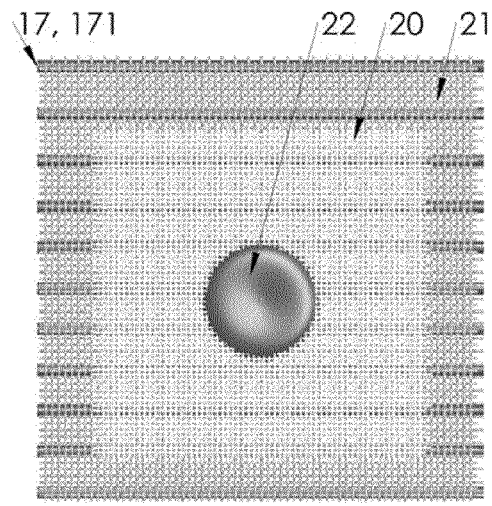

FIG. 10d shows a use of a stabilization point (22) between a traditional support cloth (18) and a screen cloth (20) seen in a plan view. FIG. 10h shows use of a stabilization point (22) between a support layer (17) according to the invention and a screen cloth (20, 21) seen in a plan view.

Figure 11A:
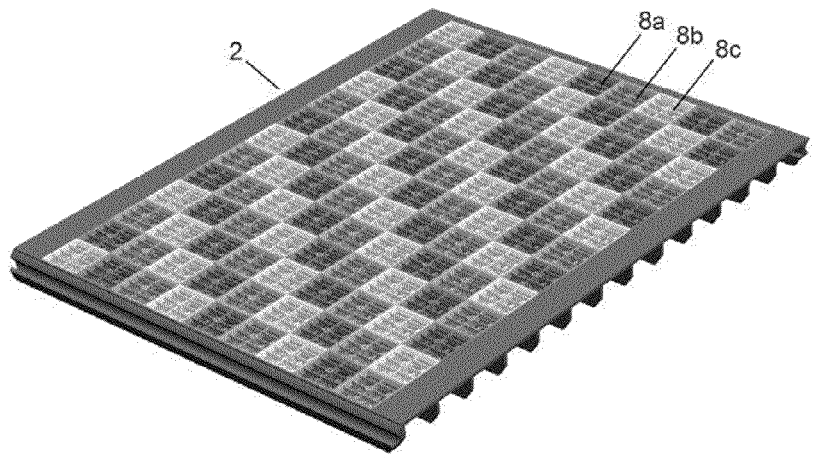

FIG. 11a shows a shaker screen filter (2), here with a regular pattern of varying different cell plug filters (8a, 8b, 8c) of varying filter cut-point.

Figure 11B:
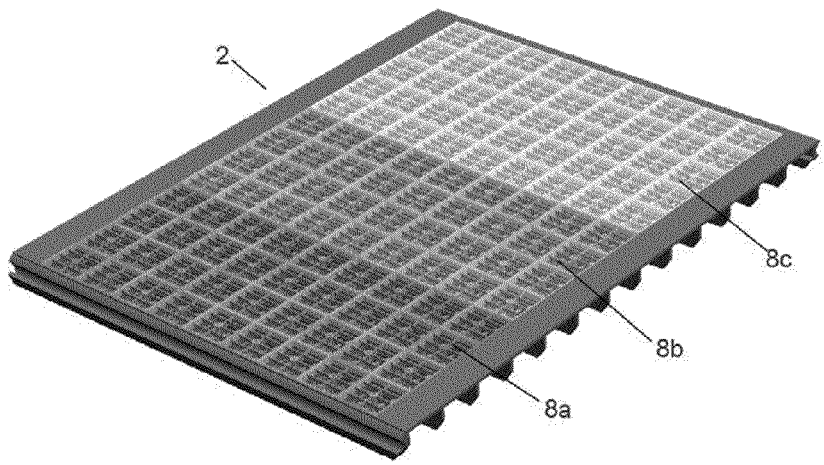
Figure 11C:
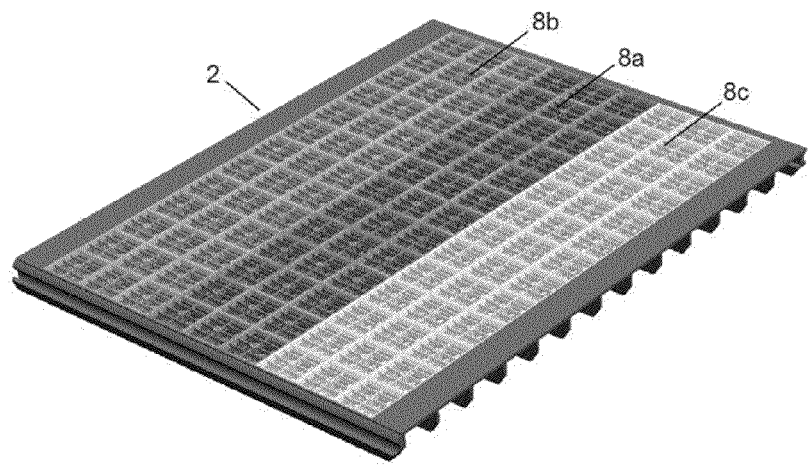
Figure 12:
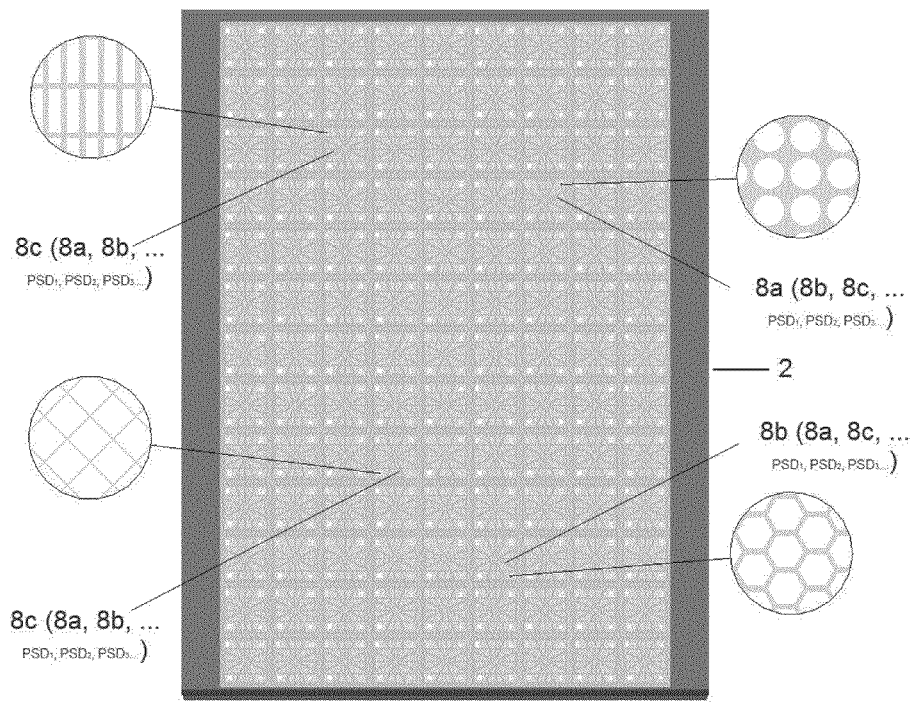

FIG. 11b shows a shaker screen filter (2), here with three large fields in a row, within the main frame with cell plug filter (8) with internally equal filter cut-point. FIG. 11c shows a shaker screen filter (2), here with long rows of internal identical cell plug filter (8) with varying cut-point, consequently a variation transverse to the one in FIG. 11b. FIG. 12 shows a shaker screen filter (2) with different cell plug filters (8) with variously designed filter membrane with even or varying cut-point. Such a permeable membrane, which even may be formed in other ways than for a woven cloth, may nevertheless constitute what we call the filter cloth (20) in a cell plug filter, and may be formed by e.g. etching or laser engraving of an original closed membrane in a way that one achieves the desired cut-point for the particular cell plug filter.

Figure 13:
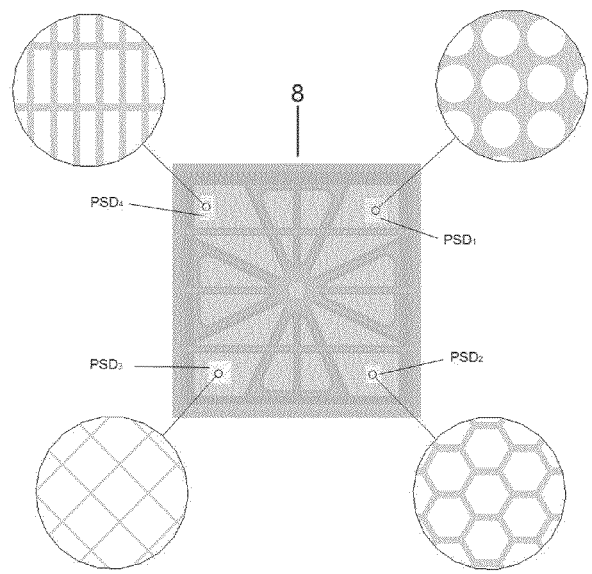

FIG. 13 shows one single cell plug filter (8) with variously designed apertures of a membrane that works as a filter cloth (20), wherein the apertures have different lateral designs, and with homogenous or varying cut-point. The apertures within different portions of a screen cloth or more cell plug filters may be round, slit shaped, diagonal squares, hexagonal apertures, etc. The hexagonal apertures will have the advantage of having very short balk lengths compared to their combined aperture.

FIG. 14a shows a screen cloth frame with cell plug filters with a common screen cloth structure with crests of their screen cloths (20) arranged in a longitudinal corrugated structure, in a way that they together forms longitudinal crests and grooves.

FIG. 14b is a cross-sectional view through a row of such cell plug filters across their crest shaped screen cloth (20).

FIG. 14c is perspective view of such a cell frame filter with such a crest-shaped screen cloth, as preferably is sealed by a gable form which protrudes above the frame of the cell plug filter.

FIG. 14d is an end elevation view of such a cell plug filter with a longitudinal crest.

Figure 15A:
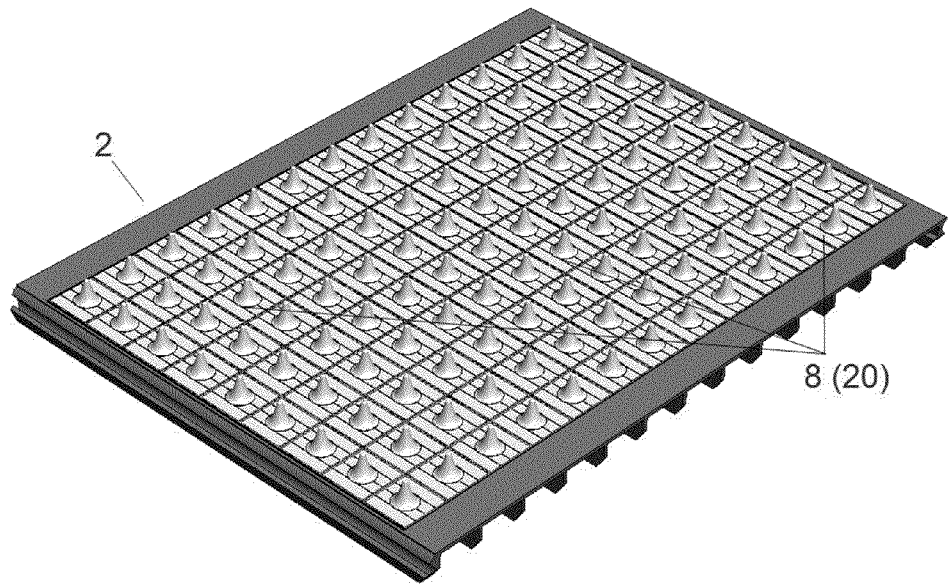
Figure 16A:
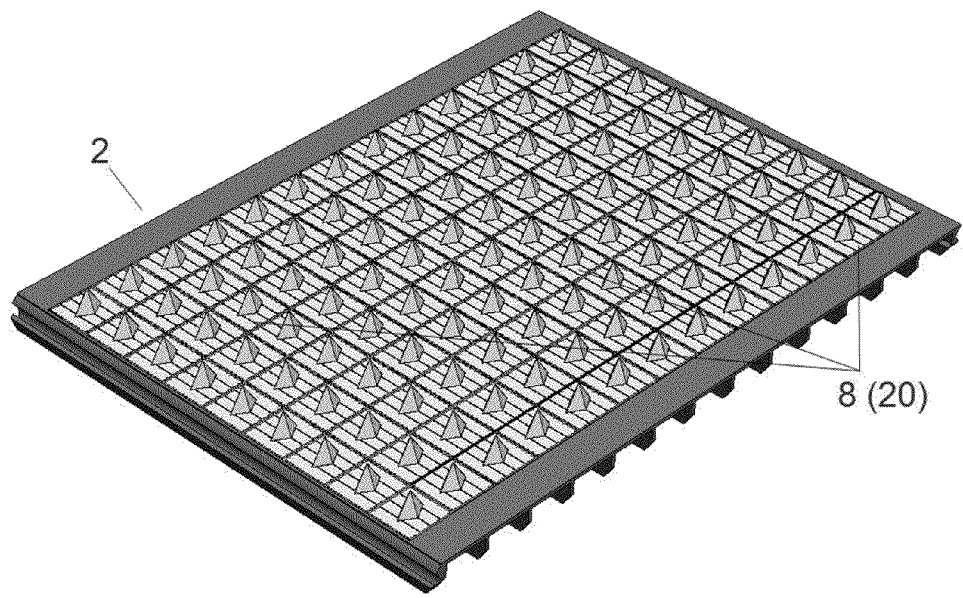

FIGS. 15a and 16a show screen cloth frames with inserted cell plug filters wherein the screen cloth (20) of the cell plug filter comprise round hats, and pyramid shaped hats, respectively.

Figure 15B:
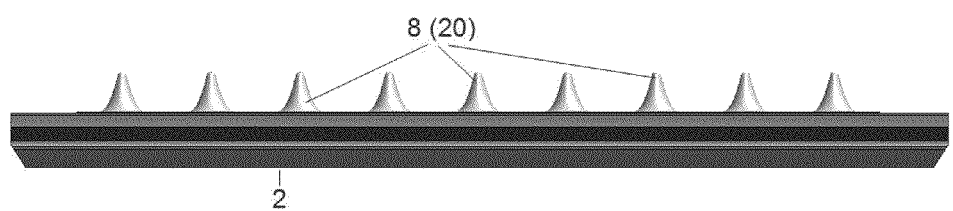
Figure 15C:
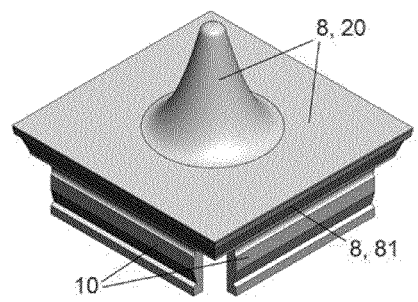
Figure 16B:
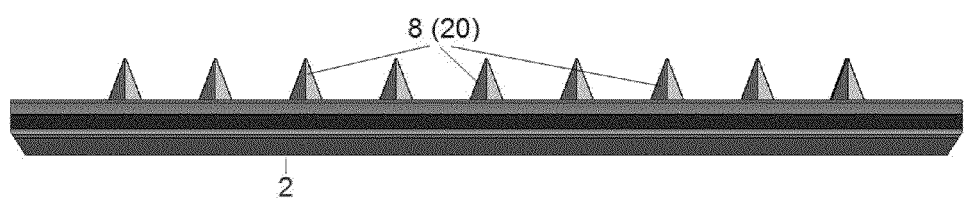
Figure 16C:
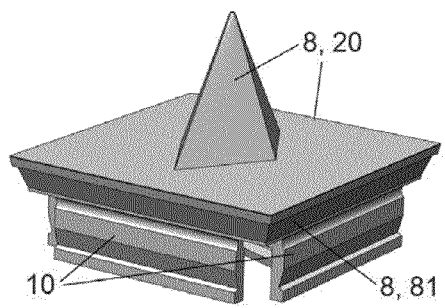

FIGS. 15b and 16b shows corresponding side elevation views of screen cloth frames with such round, accordingly pyramid formed hat formed filter cloth portions, and FIGS. 15c and d, and FIGS. 16c and d, shows perspective elevation and end elevation views of such round and pyramid formed hat shaped screen cloths, respectively, in cell plug filters.

DESCRIPTION OF PREFERRED EMBODIMENTS OF THE INVENTION

The invention is in a first aspect an improved shaker screen filter (2) for a well fluid shale shaker (7). The shaker screen filter (2) comprises a main frame (1) arranged for being placed in the well fluid shale shaker (7) for screening, preferably under vibration, of drilling mud. The mainframe (1) is subdivided into a plurality of smaller cell frames (4). The shaker screen filter (2) comprises one or more cell plug filters (8) with one or more layers of screen cloths (20) on top of at least one support cloth or support layer (18,17). Each cell plug filter (8) comprises a cell plug filter frame (81) arranged to be held in each of the cell corresponding frames (4) of the main frame (1). One or more of the cell plug filter frames (81) is provided with a locking mechanism (85, 10, 12, 13, 15) arranged for locking the cell plug filter frame (81), upon desire, in a preferred position in the cell frame (4), or releasing the cell plug filter frame (81) from the cell frame (4), respectively.

The invention is, in a second aspect, an improved cell plug filter (8) for a shaker screen filter (2) for a well fluid shale shaker (7). The shaker screen filter (2) has a main frame (1) arranged for being placed in said well fluid shale shaker (7) for vibration screening of the well fluid mud. The mainframe (1) is subdivided into a plurality of smaller cell frames (4). Characterizing for the invention is that the cell plug filter (8) comprises one or more layers of screen cloth (20) arranged on top of at least one support cloth or support layer (18,17), wherein each cell plug filter (8) comprises a cell plug filter frame (81) arranged to be held in said cell frame (4) in the main frame, and wherein at least one of the cell plug filter frames (81) comprises a locking mechanism (85, 10, 12, 13, 15) arranged for locking said cell plug filter frame (81), upon desire, in a preferred position in said cell frame (4), or releasing said cell plug filter frame (81) from said cell frame (4), respectively.

In an embodiment of the invention the support layer (17) comprises essentially a set of longitudinal set of wires (171) or corresponding thin ribs, without crossing wires, so that the support layer (17) has an even top side of parallel cylinder sides so that no localized wear points between the support cloth and the overlying screen cloth (20) occur. The omitted crossing wires make the aperture between the uniform wires (171) in the support layer (17) larger than the apertures in a corresponding support cloth (18). The uniform wires may be supported by vertical beams (9) which subdivides the cell plug filter (8) into smaller frames.

In a preferred embodiment of the invention the longitudinal set of wires (171) of said support layer (17) are arranged in said cell plug filter (8) and preferably relative to said main frame (1) parallel with a main direction of the vibration of said mainframe (1). In this way two advantages be obtained: the longitudinal wires (1) will not collide during its longitudinal vibration movement with particles that could pass through the screen cloth (20) and this contributes to prevent particles from attaching to the wires of the support layer. At the same time the wires that are vibrated in their longitudinal direction will not be actively set in vibration in their transverse direction. In this way the internal vibration load on the wires (171) is reduced.

In an embodiment of the invention the locking mechanism (85, 10, 12, 13, 15) of the cell plug filter frame (81) is preloaded in a locking position relative to the cell frame (4) in the way that the locking mechanism, in a passive or partly defect condition, is locking, and that this preloading has to be counteracted to release the cell plug filter frame (81) from the cell frame (4).

Preferably this embodiment of the invention is such that the locking mechanism comprises a first, outward facing locking profile (85) along the edge of said cell plug filter frame (81), preferably on an edge of a resilient sidewall (10) arranged for engagement with a corresponding second edge profile (5) along said cell frame (4) in its passive state.

Figure 5A:
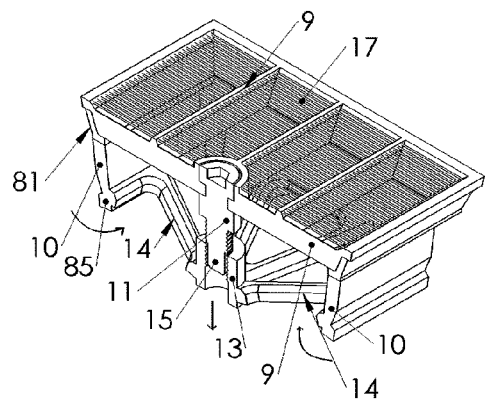
FIG. 5A is a longitudinal central vertical section through an isometric sketch of a cell plug filter through an assembly screw and a part of a locking mechanism in an open position which in a preferred embodiment is the position that requires tensioning to be put into the open position.
Figure 5B:
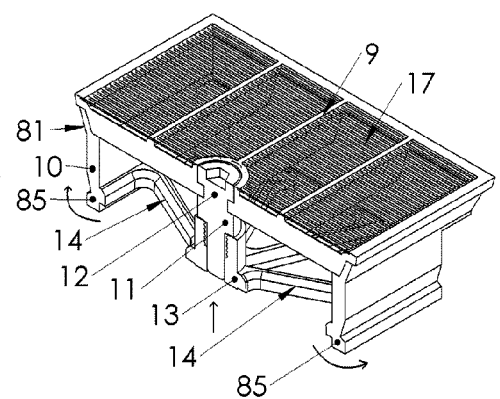
FIG. 5B shows the same as in FIG. 5a, but in a locking position as in a preferred embodiment is the passive position in case of failure of the assembly screw. In this way the integrity of the shaker screen filter is secured, even if any damage in the release mechanism of the locking mechanism should occur, the cell plug filters are held in position.
Figure 5C:
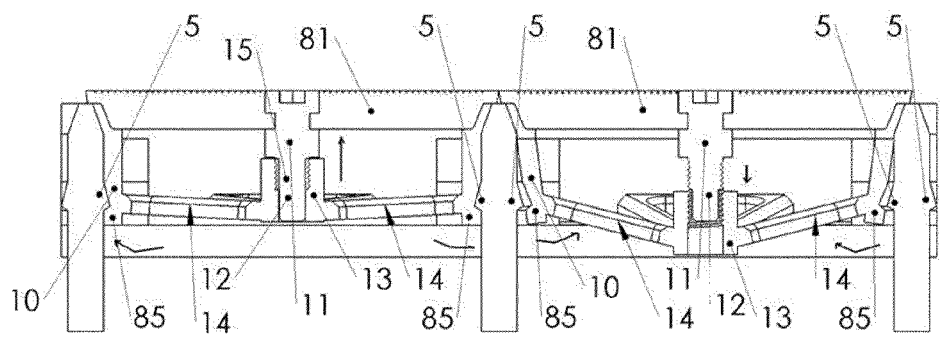
FIG. 5C shows the same as FIGS. 5A and 5B, but wherein the cell plug filter frames are inserted in a cell and are in an open position, respectively locked in the locking profiles in each respective cell frames in the mainframe. The cell plug filter is here shown with a support layer.
Figure 5D:
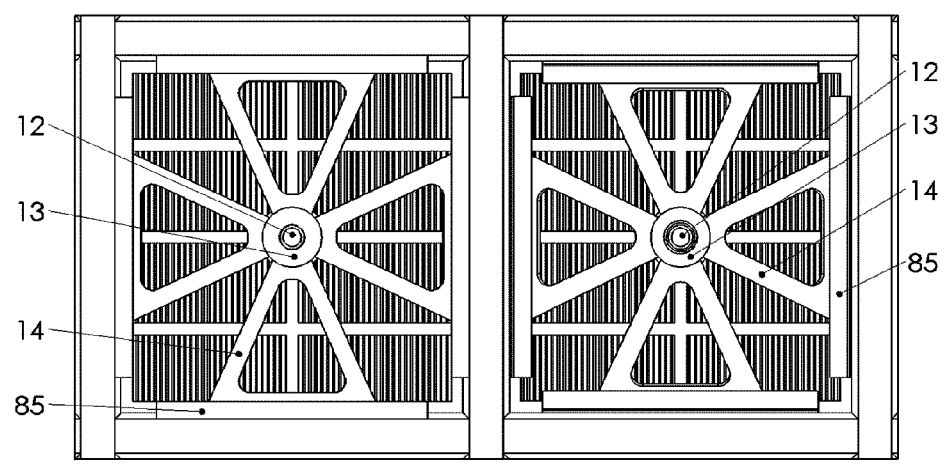
FIG. 5D is a plan view as seen from the underside of the cell frames and the two cell plug filters shown in FIG. 5A, B, C. Here it is shown how the cell plug filters longitudinal edge profile interact in open and locked positions, with the edge profile of the cell frame.

The side wall may, in an embodiment, be non-resilient and controlled by the link-arm structure (14). The locking mechanism (85, 10, 11, 12, 13, 14) further comprises a displacement mechanism (12, 13) arranged for moving the first locking profile (85) out of engagement with the edge profile (5) of the cell frame. This is illustrated in detail in FIGS. 5a, b, c and d. The displacement mechanism of the locking mechanism (12, 13) comprises a screw mechanism (12, 13) arranged via a link-arm structure (14) for moving the first locking profile (85) and the other edge profile (5) into and out of mutual engagement, se the interaction between the edge profile (5) and the locking profile (85) in FIG. 5c.

In a further preferred embodiment of the invention the screw portion (12) in a center sleeve (13) connected to the link arm structure (14) in a screw mechanism (12) is inserted from an upstream side of the cell plug filter frame (81) in a way that the screw part, if upon a failure should be released from the cell plug filter frame (81) or the screw mechanism (12,13) itself, ends up on the upstream side of the cell plug filter frame (81) and is prevented from ending up in the filtered fluid.

Figure 15D:
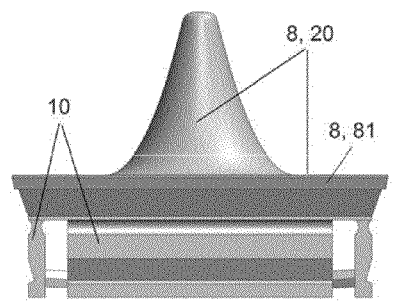
Figure 16D:
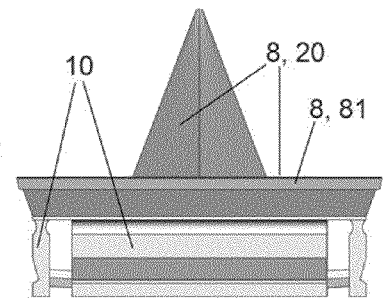

But the cell plug filter frame's (81) locking mechanism may also have an embodiment with the link-arm system (14) may be displaced into and out of the locking position by displacement using a hand tool on the cell plug filter frame's lower face, so a screw is not needed, so the screen cloth (20) on the cell plug filter frame's top side do not need to be broken by a through screw head. In some preferred embodiments of the invention the screen cloth (20) will not have such a design that a through screw is not desired, as the example shown in FIGS. 14c and 14d where a longitudinal ridge structure is formed by a part of the screen cloth (20) so that they together form longitudinal crests and grooves, se FIGS. 14a and 14b. In other embodiments as shown in FIGS. 15c and 15d preferred embodiments of the cell plug filter's filter cloth (20) may comprise round hats, or pyramid shaped hats, see FIGS. 16c and 16d, respectively. Such upwards protruding shapes of the filter cloth (20) will be able to increase the flow trough area of the filter cloth (20) and supplementary counteract undesired splashing of the well fluid while the drilling vessel is rolling.

In an embodiment of the invention the screen cloth (20) is stretched out over the cell plug filter frame's (81) upper edge and down on the outer face of the cell plug filter frame (81) between the cell plug filter frame (81) and the surrounding cell frame (4). Alternatively the screen cloth may end along the edge of the cell plug filter frame's (1) upper edge or be casted into the upper edge of this.

Figure 4:
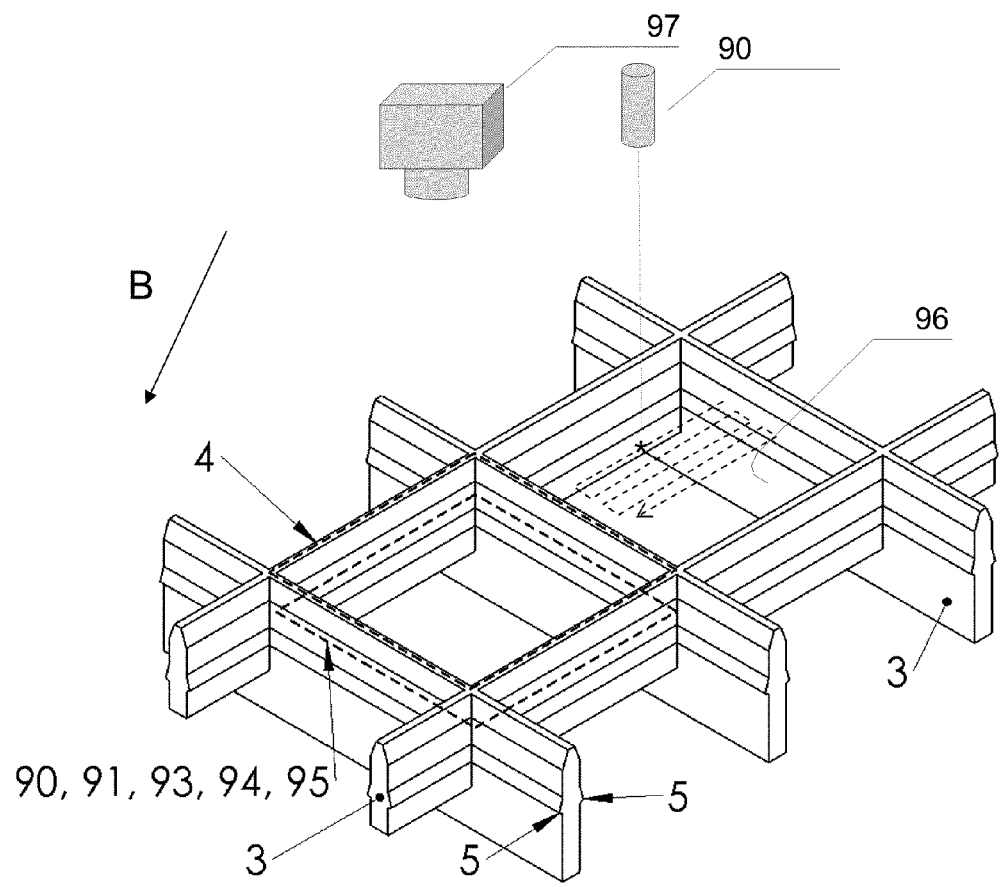
FIG. 4 is an isometric cut-out portion of the frame work of the main frame which forms cells comprising bar formed longitudinal locking profiles for cell frame filters in the cells.

In an embodiment of the invention it is arranged a condition sensor (90) arranged for sensing at least a material condition of at least one of said cell plug filters (8), for instance whether said screen cloth (20) is intact or broken, or if it is entirely or partly worn down. The condition sensor (90) may comprise an electromagnetic sensor (91), for instance by an electrical coil included in the cell frame (4) and indicated in FIG. 4. The electromagnetic condition sensor (91) is arranged sensing electrical properties for instance by an electric coil (93) for measuring alternating current resistivity, changes in alternating current resistivity, electric phase change, or other alternating current induced parameters, or by an electric coil (94) or magnetometer (95) for measurement of magnetic susceptibility or magnetization. The condition sensor (91, 92, 93, 94, 95) may alternatively be arranged in the cell plug filter itself (8), preferably in the cell plug filter frame (81).

The sensor (90) may in another alternative embodiment comprise electrodes (92) for measuring direct current resistance. The electrical sensor (91, 92, 93, 94) may in an embodiment be arranged with a distance to the cell frame filter (8), for instance as an electric sensor coil arranged near the filter cloth (20) to sense the filter cloth's electromagnetic properties, but this may constitute a less exact embodiment than if the sensor is fixed placed in the cell frame (4) or the cell plug filter (8) because of the then fixed distances.

In another embodiment of the invention's sensor arrangement may the condition sensor (90) comprise an acoustic sensor (96), for instance a sensor for said cell plug filter's (8) screen cloth's (20) acoustic natural frequency or changes in said natural frequency or said screen cloth's (20) amplitude resulting from a given vibration admission. The cell plug filter's (8) screen cloth (20) may be magnetized in a local magnetic field B and induce a alternating voltage in the electrical coil (92, 93) so that the screen cloth (20) within the cell plug filter frame (81) works almost as a magnetized microphone membrane. The condition sensor (90), may comprise an optical sensor (97).

The sensor (90) may in another embodiment of the invention be implemented as a laser sensor arranged to sweep over the cell plug filter's (8) screen cloth (20) for measuring the cell plug filter's (8) screen cloth's (20) acoustic natural frequency or changes in the natural frequency or the screen cloth's (20) amplitude resulting from a given vibration admission.

The device according to claim 1 or 2, is a first cut-point or particle size distribution (PSD1) in the screen cloth (20) of one or more first cell frame filters (8) distinguishes from a second cut-point or particle size distribution (PSD2, PSD3, PSD4, . . . ) in the screen cloth (20) of one or more second cell frame filters (8), se FIG. 11a, where the cell plug filters of different cut-point are arranged alternating square by square, and in FIGS. 11b and 11 c where they are lined up in different rows. In this way one may pre-determine the properties of the shaker screen filter to provide an overall desired particle size distribution combined, instead of a homogenous particle size distribution for the total particle content of the passing liquid.

Further, the first cut-point or particle size distribution (PSD1) in a screen cloth (20A) of one or more first cell frame filters (8A) which is different from a second cut-point or particle size distribution (PSD2) in a screen cloth (20B) of one or more second cell frame filters (8B) may be identified using a marker, for instance a color coding (16) or color combination, text, numbering, or surface structure of the cell plug filter frame (81), or by electronic marking by e.g. an RFID-tag. The RFID-tag may be arranged for receiving sensor measurements form the cell plug filter's (8) appurtenant sensor (90), as is particularly easy to implement if the sensor is arranged in the cell plug filter (8) itself or in the cell frame (4).

As explained in connection with the figure captions, the main frame (1) may be provided with a joint profile (6) in a front end arranged to be arranged in engagement with an entry gasket (25) in) in a adjacent shaker screen filter or in a well fluid shale shaker (7).

In an embodiment of the invention there is formed a stabilization point (22) in one or more cell frame filters (8), the stabilization point (22) formed in a synthetic or a curing paste material, and placed for instance by injection of unhardened material between the wires of said screen cloth (20) and the underlying support layer (17) or support cloth (18), respectively.

COMPONENT LIST

1. Mainframe (1)
2. shaker screen filter (2)
3. Framework (3)
4. Cell frame (4)
5. Edge profile (5)
6. Joint profile—groove (6a)
   Joint profile—tongue (6b)
7. Well fluid shale shaker (7)
8. Cell plug filter (8)
9. Beam (9)
10. Dynamic sidewall (10)
11. . . . (11)
12. Assembly Screw (12)
13. Center sleeve (13)
    displacement mechanism (12, 13)
    screw mechanism (12, 13)
14. Link arm structure (14)
15. Thread free screw area (15)
16. Color marking(16)
17. Support layer (17)
18. Support cloth (18)
19. Entry—top (19a)
    Entry—bottom (19b)
20. Screen cloth (20)
21. Coarser lower screen cloth (21)
22. Stabilization point (22))
23. Sealing profiles—upper (23a)
    sealing profiles—lower(23b)
24. Sealing profile groove—upper (24a)
    Sealing profile groove—lower (24b)
25. Entry gasket (25)
26. Cell plug filter frame (81)
27. outwards facing locking profile (85)
28. Condition sensor (90)
29. Electromagnetic sensor (91)
30. Electrodes (92)
31. Electrical coil (94)
    alternating current resistance (93)
32. electrical coil magnetic susceptibility (94)
33. Magnetometer (95)
34. Wires, threads (171)
35. Woven wire grid (181)
36. Pull hook (36)
37. Lead profile (37)
38. Engagement profile (38)

The invention claimed is:

1. A cell plug filter for a shaker screen filter for a well fluid shale shaker, wherein said shaker screen filter has a main frame arranged for being mounted in said well fluid shale shaker for screening of a well fluid mud, wherein said mainframe is subdivided into a plurality of smaller cell frames, wherein said cell plug filter comprises:
   one or more layers of screen cloth arranged on top of at least one support layer, wherein each cell plug filter comprises a cell plug filter frame arranged to be held in said cell frame in the main frame,
   wherein at least one cell plug filter frame comprises a locking mechanism arranged for locking said cell plug filter frame, upon desire, in a preferred position in said cell frame, correspondingly releasing said cell plug filter frame from said cell frame,
   wherein said locking mechanism is preloaded in a locking position relative to said cell frame so that said locking mechanism in a passive or partly defect condition is locking, and said preloading has to be counteracted to release said cell plug filter frame from said cell frame,
   wherein said locking mechanism further comprises a first, outward facing locking profile along two or more edges of said cell plug filter frame arranged for engagement with a corresponding second edge profile along said cell frame in its passive state, and
   wherein said locking mechanism further comprises a displacement mechanism arranged with a screw mechanism, said screw mechanism comprises an assembly screw held through one or more beams in said support layer, said displacement mechanism comprises a link arm structure extending between, and is fixed to, said locking profile and a threaded central sleeve, and said threaded central sleeve is arranged for being moved along an axial direction of said assembly screw for moving said link arm structure thus retracting said first locking profile out of engagement with said second edge profile of said cell frame at said two or more edges of said cell plug filter frame simultaneously.

2. The cell plug filter according to claim 1, wherein said support layer comprises essentially a longitudinal set of wires.

3. The cell plug filter according to claim 1, wherein said longitudinal set of wires of said support layer are arranged in said cell plug filter and relative to said main frame essentially parallel with a main direction for the vibration of said mainframe.

4. The cell plug filter according to claim 1, wherein a screw portion of said screw mechanism is arranged from an upstream side of said cell plug filter frame in a way that if said screw portion upon a failure should be released from said cell plug filter frame or said screw mechanism itself ends up on the upstream side of the cell plug filter frame and is prevented from ending up in the well fluid mud on an upstream side of the cell plug filter.

5. The cell plug filter according to claim 2, wherein said wires of said support layer along an upper face towards said overlaying screen cloth are flush with an upper portion of said cell plug filter frame.

6. The cell plug filter according to claim 1, wherein said screen cloth is fastened near an upper portion of said cell plug filter frame.

7. The cell plug filter according to claim 2, wherein said screen cloth is spanned over an upper portion of said cell plug filter frame and extends down along an external side of said cell plug filter frame between said cell plug filter frame and said surrounding cell frame.

8. The cell plug filter according to claim 1, with a condition sensor arranged for sensing at least a material condition of at least one of said cell plug filters.

9. The cell plug filter according to claim 8, wherein said condition sensor comprises an electromagnetic sensor.

10. The cell plug filter according to claim 9, wherein said electromagnetic sensor is arranged for sensing electromagnetic properties of said cell plug filter's screen cloth, by:
 electrodes for measuring direct current resistance,
 an electric coil for measuring alternating current resistivity, changes in alternating current resistivity, electric phase change, or other alternating current induced parameters, or
 an electric coil or magnetometer for measurement of magnetic susceptibility or magnetization.

11. The cell plug filter according to claim 9, wherein said electromagnetic sensor is arranged mounted as an integrated part of said cell plug filter, preferably in said cell plug filter frame.

12. The cell plug filter according to claim 9, wherein said electromagnetic sensor is mounted without mechanical contact with said cell plug filter.

13. The cell plug filter according to claim 12, wherein said electromagnetic sensor is mounted in said cell frame of said main frame.

14. The cell plug filter according to claim 8, wherein said condition sensor comprise an acoustic sensor.

15. The cell plug filter according to claim 8, wherein said condition sensor comprises an optical sensor.

16. The cell plug filter according to claim 1, wherein a first cut-point or particle size distribution in said screen cloth of one or more first cell frame plug filters distinguishes from a second cut-point or particle size distribution in said screen cloth of one or more second cell frame plug filters.

17. The cell plug filter according to claim 1, said first cut-point or particle size distribution in a screen cloth of one or more first cell frame plug filters which is different from a second cut-point or particle size distribution in a screen cloth of one or more second cell frame plug filters may be identified on a marking, or by electronic marking.

18. The cell plug filter according to claim 1, provided with a joint profile, in one end and in the other end arranged for mounting in engagement with each other from their separate shaker screen filter to provide mutual sealing by sealing profiles.

19. The cell plug filter according to claim 18, provided with a pull hook linked tongue and groove connection, arranged for being moved from a sealing function for disassembling at least one shaker screen filter after which entry—bottom engagement point enters an opposite corresponding engagement profile for pullout/disassembling.

20. The cell plug filter according to claim 1, provided with a joint profile in a front end arranged for being mounted in engagement with an entry gasket in an adjacent shaker screen filter or in a well fluid shale shaker.

\* \* \* \* \*